July 26, 1927.
F. PUCILLO
1,636,968
COIL TESTER
Filed March 7, 1924
2 Sheets-Sheet 1
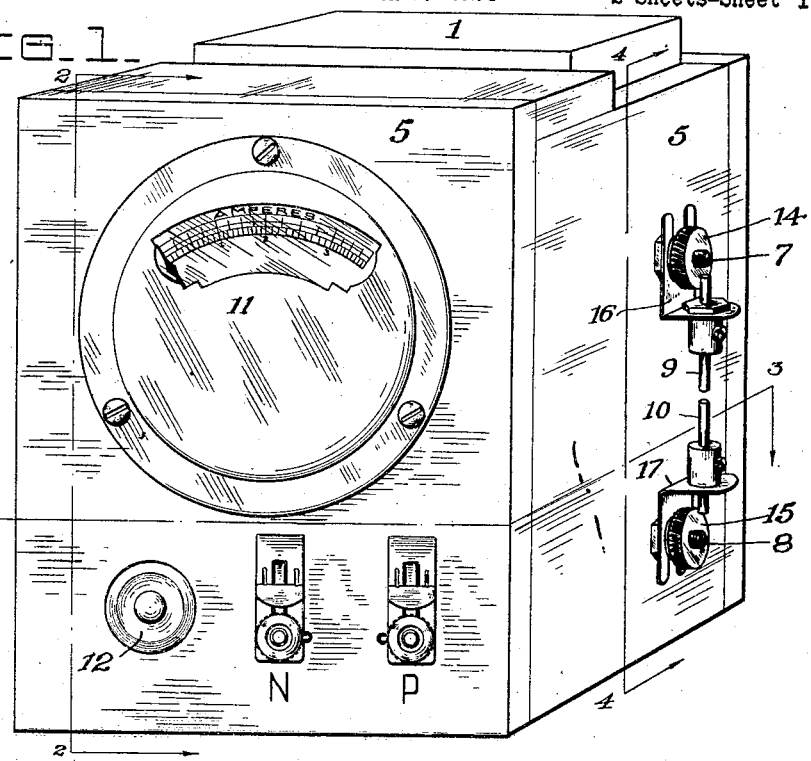
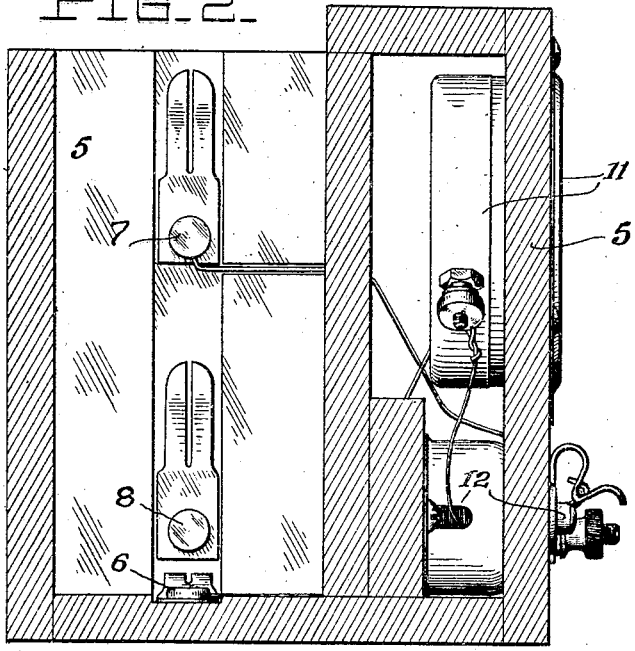
Inventor
Frank Pucillo,
by
Attorney July 26, 1927.  1,636,968
F. PUCILLO
COIL TESTER
Filed March 7, 1924  2 Sheets-Sheet 2
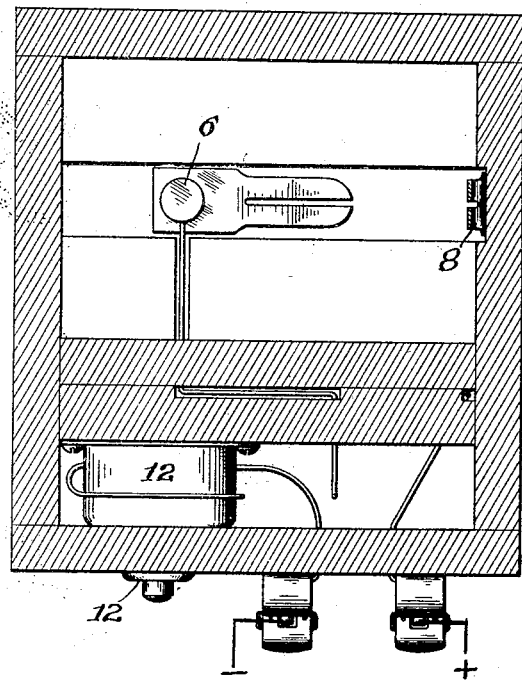
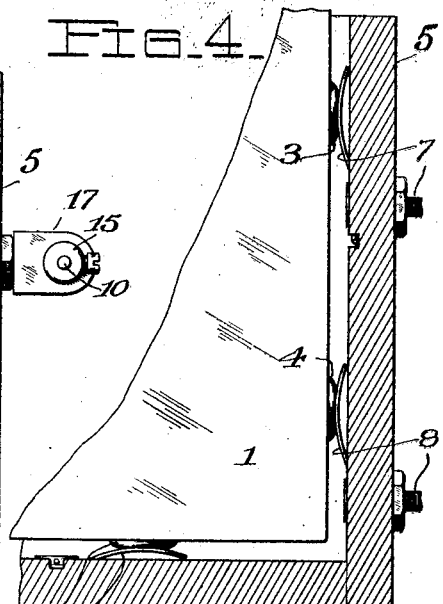
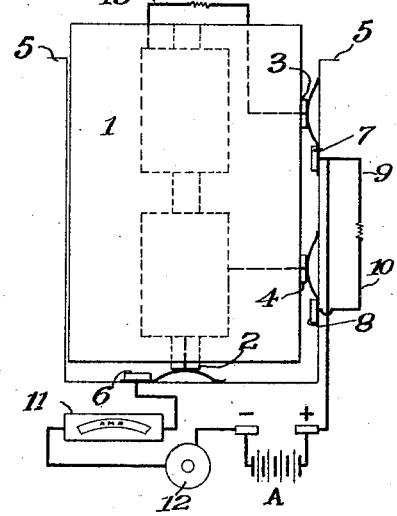
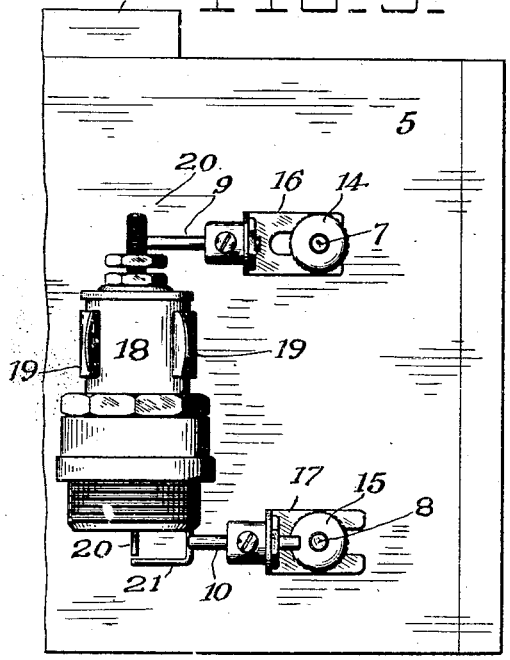
Inventor
Frank Pucillo
by
Attorney Patented July 26, 1927.

1,636,968

UNITED STATES PATENT OFFICE.

FRANK PUCILLO, OF BRIDGEPORT, CONNECTICUT.

COIL TESTER.

Application filed March 7, 1924. Serial No. 697,450.

This invention relates to a testing device for spark coils, and has for its object to provide a simple and effective means for accomplishing this, which will readily be understood from the following description, and then specifically designated by the claim.

In the accompanying drawing which forms a part of this application

Figure 1 is a frontal perspective view of the tester and spark coil as they appear when in condition for operation—

Figure 2 a section at line 2—2 of Figure 1, with the spark coil omitted—

Figure 3 a section at line 3—3 of Figure 1 with the spark coil omitted—

Figure 4 a broken section at line 4—4 of Figure 1—

Figure 5 a side elevation showing the improvement adapted for testing spark plugs, and Figure 6 a schematic view in front elevation showing particularly the circuits.

Similar numerals of reference denote like parts in the several figures of the drawing.

Spark coils are well known and no description thereof will be given herein, nor has it been deemed necessary to show the usual vibrator at the top of the coil except in so far as it is shown at Figure 6 where it merely appears in gap spark form and interposed in the spark coil circuit.

This spark coil is designated generally by the numeral 1, and has a bottom terminal 2 and upper and lower side terminals 3 and 4 respectively, and these terminals are all in circuit with a battery when a set of these coils is installed in a Ford car.

The improved testing device comprises a casing 5 having a bottom contact 6 and upper and lower side contacts 7 and 8 respectively, and when a spark coil 1 is to be tested it is inserted within this casing with its bottom and side terminals against the bottom and side contacts of the casing, as clearly shown at Figure 4.

The bottom contact 6 is connected to the negative pole of the battery A while the positive pole is connected directly to the upper contact 7, and these two contacts 7 and 8 lead directly to gap spark elements 9 and 10, respectively.

11 is an ammeter in the circuit between the battery and the contact 6, and intercepting this circuit at a point between the battery and ammeter is an ordinary circuit closer and breaker 12.

The parts being assembled for testing as shown, the circuit is closed by operating the part 12, and the amperage will be indicated by the ammeter. If the spark between the elements 9 and 10 is well pronounced it follows that the adjustment of the vibrator, indicated by the numeral 13 at Figure 6, is proper, but if this spark between the parts 9 and 10 is weak, it follows that there is something wrong with the vibrator which might be corrected by adjustment, but if the latter appears to be of no avail then the spark coil may be discarded as worthless.

Should the spark aforesaid be unsatisfactory, an inspection of the ammeter reading will determine whether the fault is with the coil or with the battery.

Referring particularly to Figure 1, it will be noted that the contacts 7 and 8 extend through the casing and are connected by thumb nuts 14 and 15 with angular brackets 16 and 17, and that the gap spark elements 9 and 10, are connected to these brackets in the proper relation for spark testing purposes as aforesaid.

Referring to Figure 5 it will be noted that the brackets 16, 17, with their respective sparking elements 9, 10, have been turned into parallelism, and that an ordinary spark plug 18 is grasped by a spring clip 19, the latter attached to the casing in an ordinary manner (not shown), and that the element 9 contacts one of the plug terminals 20, while the element 10 contacts the other plug terminal 21, and it will therefore be clear, that, by placing a spark plug in position as shown and described, not only will the sparking of the plug be useful in determining the adjustment of the vibrator, but also any defect in the spark plug itself will be apparent.

Having thus described my invention what I claim is:—

A spark gap as an article of manufacture, comprising a support, a pair of studs projecting laterally in spaced relation from one side wall of said support, a pair of angle brackets adjustably mounted on said studs for rotative and lateral sliding adjustment, the free ends of said brackets extending laterally from said support, rod members adjustably mounted in the free ends of said brackets, and a spark plug holding clamp mounted on said support between and at one side of the plane of the said studs.

In testimony whereof I affix my signature hereto.

FRANK PUCILLO.